United States Patent [19]

Fetchin et al.

[11] 4,178,310

[45] Dec. 11, 1979

[54] CATALYST FOR HYDRATION OF NITRILES

[75] Inventors: John A. Fetchin, Stamford; Kin H. Tsu, Norwalk, both of Conn.

[73] Assignee: American Cyanamid Company, Stamford, Conn.

[21] Appl. No.: 718,724

[22] Filed: Aug. 30, 1976

Related U.S. Application Data

[63] Continuation of Ser. No. 558,998, Mar. 17, 1975, abandoned.

[51] Int. Cl.$^2$ ............................................. C07C 102/08
[52] U.S. Cl. ............................. 260/561 N; 252/411 R
[58] Field of Search ................. 260/561 N; 252/411 R

[56] References Cited

U.S. PATENT DOCUMENTS

| | | | |
|---|---|---|---|
| 3,329,715 | 7/1967 | Strohmeyer et al. | 260/561 N |
| 3,642,643 | 2/1972 | Habermann | 260/561 N X |
| 3,645,913 | 2/1972 | Habermann | 260/561 N X |
| 3,696,152 | 10/1972 | Habermann et al. | 260/561 N |
| 3,766,088 | 10/1973 | Yoshimura et al. | 252/412 |
| 3,789,074 | 1/1974 | Seale et al. | 260/561 N |
| 3,795,629 | 3/1974 | Newkirk et al. | 260/561 N X |
| 3,846,495 | 11/1974 | Svarz | 260/561 N |
| 3,886,213 | 5/1975 | Fetchin et al. | 260/558 R X |
| 3,894,962 | 7/1975 | Allain et al. | 260/561 N X |

FOREIGN PATENT DOCUMENTS 2164186 6/1972 Fed. Rep. of Germany.

OTHER PUBLICATIONS

Habermann et al., CA 77:151519s (1972).
Yoshimura et al., CA 77:113835j (1972).
Kurata et al., and Tamara et al., CA 79:67043r, and 79:67049x (1973).

*Primary Examiner*—Thomas Waltz
*Attorney, Agent, or Firm*—Gordon L. Hart

[57] ABSTRACT

Solid catalyst of reduced copper magnesium silicate type is improved for its use in catalytic hydration of acrylonitrile to make acrylamide by calcining the catalyst prior to such use. Calcining strengthens the catalyst particles for longer catalyst life in the reactor and slows the rate of decay of catalytic activity so the average productivity over the life of the catalyst is improved.

4 Claims, No Drawings

CATALYST FOR HYDRATION OF NITRILES

This is a continuation, of application Ser. No. 558,998, filed Mar. 17, 1975, now abandoned.

The invention relates to improvements in the catalytic hydration of nitriles with water to produce amides by a continuous process using certain solid heterogeneous catalysts for the reaction. More particularly, the invention provides an improvement in solid catalyst used for such reaction, having improved physical strength which improves the length of useful catalyst life with consequent increase of the amount of product that can be produced with a given amount of the catalyst.

The particular type of catalyst to which the invention relates was in use before it was improved by the present invention.

This particular type of catalyst, called copper-magnesium silicate catalyst, was prepared by precipitation of copper and magnesium from aqueous solution by introducing alkali metal silicate and alkali metal carbonate into a solution of copper and magnesium salts. The copper-magnesium carbonate silicate precipitate was separated by filtration from the mother liquor, washed, dried and pressed or extruded to form pellets, beads, or the like which were further dried and then shipped, stored and charged to the reactor in dry pellet form. Treatment with a reducing gas was deferred until just before the catalyst use. Catalysts of this type may preferably also contain in minor proportions, e.g. 0.01 to about 5 percent by weight, of one or several promoters such as compounds of barium, zinc, cadmium, chromium, molybdenum, tungsten, vanadium, uranium, titanium, thorium or the like. Catalysts with such promoters are prepared in some instances by precipitating the promoter together with the insoluble copper and magnesium compounds from a similar copper magnesium solution which further contains a correspondingly small amount of a dissolved salt of the selected promoter metal in addition to the copper and magnesium salts. Reference is made to the German Patent No. 869,052 for more detailed description of the preparation of catalyst of the type described. Belgium Patent Nos. 813,973 and 813,974 described typical hydration of acrylonitrile using such catalysts. A typical catalyst of this type is available commercially from Badische Anilin & Soda Fabrik AG, Ludwigshafen, West Germany under the tradename BASF Catalyst R3-11, also called BTS Catalyst. It contains approximately 30 percent by weight of copper combined in compounds of copper dispersed throughout the magnesium silicate matrix. This catalyst is supplied in cylindrical pellets about ⅛ inch long×3/16 inch diameter.

For its particular use in the hydration of nitrile the catalyst is activated by reduction with hydrogen or other effective reducing agents. Preferably the reduction is carried out with hydrogen at 180° to 230° C. and preferably with the catalyst already placed in the fixed-bed reactor and also preferably just prior to use of the catalyst for the continuous hydration process. After the catalyst has been reduced the reduced catalyst is kept away from oxygen to avoid oxidation of catalytic copper surface areas and consequent loss of catalytic activity.

Combined copper in the catalyst is conveniently reduced to elemental copper by first charging the catalyst pellets to the bed of a fixed bed catalytic reactor which is to be used for the hydration process. Then a stream of reducing gas is fed through the catalyst bed at temperature in the range from 180°-230° C. until there is no further reduction to elemental copper at the selected reducing conditions. The reducing gas is preferably hydrogen, but other reducing gas such as carbon monoxide or the like could be used. It is preferred to first heat the catalyst with not nitrogen to about 120° to 160° C. and then gradually add hydrogen to the nitrogen stream until the bed temperature is raised to about 180°-230° C. The reaction for reduction of copper with hydrogen is exothermic and the bed temperature is maintained at the selected temperature by regulating the gas feed rate and adjusting the concentration of reducing gas in the gas feed. Depending upon the particular reducing conditions selected, the reduction step as described usually is completed in about 8 to 24 hours. After cooling the catalyst bed, the reactor is ready for introduction of a nitrile-in-water reactant solution as the feed stream to commence the continuous hydration reaction. During the treatment with reducing gas to reduce the copper, the catalyst is sensitive to excessive temperature and it is necessary to carefully regulate the bed temperature during reduction to avoid deactivation by overheating the catalyst. We prefer to avoid heating the catalyst bed beyond an upper limit of about 230°-250° C. to preserve the catalyst during the reducing reaction. Deactivation, or at least a considerable loss of activity can be expected as temperatures about 250° C. are approached or exceeded during portions of, or all of the reduction step.

For the hydration of acrylonitrile with water the catalyst obtained commercially and reduced as described, was found to produce very high yield of acrylamide at conversion rates comparable with those obtained with a good reduced copper chromium oxide catalyst, notwithstanding the considerably lower proportion of copper in this catalyst. This catalyst was clearly superior to a good copper chromium oxide catalyst on the basis of higher conversion per hour per pound of copper in the catalyst and on the basis of longer catalyst life, that is, a slower rate of decay of the catalytic activity as the hydration process was carried out continuously. A principal disadvantage with this catalyst was that the catalyst particles did not have as much physical strength as would have been desired. This was particularly so after the catalyst had been reduced and washed with the liquid reactants. The pellets were apt to fracture and crumble causing blockage and channeling in the fixed catalyst bed with consequent loss of circulation of reactants to much of the effective catalytic surface area in the catalyst bed. This was found to be especially severe in large industrial size catalyst beds containing several tons of the catalyst. Furthermore, solid polymer was apt to form at regions of lost circulation in the catalyst bed causing those regions to solidify. Such events would drastically reduce the effective activity of the catalyst bed. Thus, because of the inadequate physical strength of the catalyst particles, much of the advantage of the long catalyst life would be lost by irreversible physical deterioration of the catalyst bed structure during use.

According to the invention, catalyst particles of the copper-magnesium silicate type described herein are treated by calcining the catalyst particles at high temperature in an essentially, non-reactive atmosphere. The calcining can be carried out either before or after the catalyst has been reduced. It was expected that the high temperature needed for effective calcining to improve particle strength (300°–500° C.) would cause physical deterioration of the particles, either by fracture and crumbling of the particles or by sintering of the active copper, or would otherwise cause deactivation of the catalytic copper, thus spoiling the catalyst for subsequent use. Deactivation of the same catalyst had in fact been reported during reductions carried out at excessively high temperature. Also, destructive physical deterioration of the catalyst had been observed during attempts at high temperature oxidation for regeneration of the spent catalyst. It is found however, that calcining the catalyst before it is used in the hydration reaction, either before or after the reduction of the catalyst, at calcining temperatures in the range from about 300° C. to about 500° C. for periods in the range from about one hour up to about 48 hours, does not cause as much physical deterioration or deactivation of the catalyst during such calcining step as might have been expected. The calcining does in fact physically strengthen the catalyst. More important, such calcining is found to increase the effective catalyst life as the catalyst is used in a fixed bed reactor for the hydration of acrylonitrile with water.

It had been anticipated that high temperature calcining before the reduction step would cause chemical changes of the copper compounds during calcining, and it was expected that such chemical change probably would detract substantially from the excellent activity and catalyst life when the calcined catalyst was reduced and used for the catalytic hydration reaction. As was expected, the calcining does in most instances reduce the initial activity of the catalyst, but this can be kept to a tolerable extent. However, the rate of decay of catalyst activity of the catalyst in a fixed bed reactor during the continuous hydration reaction is so much improved by the calcining treatment, that the increase of effective catalyst life by slower decay of activity will more than compensate for the reduced initial activity. More acrylamide will be produced during the extended useful life of the calcined catalyst than would be produced with the higher initial activity but faster decay of the uncalcined catalyst.

The process of precalcining the catalyst before the initial reduction step is distinguished from the step of preheating the catalyst to reduction temperature that was used to begin the prior art reduction step described above. In both methods the catalyst is heated prior to the initial reduction, and both may be carried out with the catalyst already placed in the reactor, but in the prior art process the catalyst was preheated only to about 140°–180° C. to help initiate the reduction reaction. In the prior art process the temperature was carefully regulated during reduction, including the preheating step, to avoid overheating the catalyst. In the calcining process the catalyst is heated in a non-reactive atmosphere, either before or after the reducing step, to a calcining temperature that is higher as contrasted with those temperatures which had been previously found suitable for the reducing step.

When the calcining process is carried out before reduction of the catalyst, we refer to that process as precalcining, as distinguished from post-reduction calcining. Precalcining is carried out in a non-reactive, e.g. non-reducing, atmosphere and the high temperature for the precalcining treatment is applied to the catalyst for a period long enough to effect substantial strengthening of the catalyst during such period of high temperature calcining. An atmosphere of heated air or other non-reducing atmosphere can be used to surround and heat the catalyst during the precalcining step. In air or any other atmosphere containing an oxidizing agent is used during precalcining, one should carefully purge the catalyst bed with inert gas, e.g. nitrogen, before introducing the reducing gas, e.g. hydrogen, to avoid any danger of explosion. It is preferred, after precalcining, to cool the catalyst at least to a lower temperature that is suitable for the reduction step before beginning the reduction step.

It is usually most convenient, but not necessary in all instances, to calcine the catalyst after it has been placed in the catalytic reactor. Alternatively, the catalyst can be precalcined elsewhere under the temperature and other conditions prescribed herein for calcining; for example, the catalyst particles might be precalcined as a final step in the manufacture of the catalyst. The precalcined catalyst prior to reduction is stable, not subject to deactivation by exposure to air, and can be handled, stored and shipped, the same as had been done in the past before reduction of the uncalcined catalyst.

After the catalyst has been precalcined, the activation by reduction and the use of the reduced catalyst for hydration are carried out essentially the same as described above for the activation of an untreated catalyst.

EXAMPLE 1

A sample taken from a batch of BASF Catalyst R3–11, as received, is tested for crush strength. A single cylindrical pellet of the catalyst is crushed by application of mechanical force in a recording pressure press. The crushing force is applied at opposed sides along the length of the cylindrical pellet. Crushing force applied is divided by length of the pellet to obtain a comparative crush strength value in units of pounds force per inch length. Nominal diameter of all of the pellets tested is 3/16 inch. The same test for crush strength is used for all the examples herein. Crush strength of the dry pellets from one batch (Batch II) as received was $126 \pm 27$ lb./in. Wetting the pellets with water is found to reduce the crush strength and not all of the original strength is restored when the wet pellet is dried. Noticeable variation in crush strength was found from one batch to another. Loss of crush strength also results from several kinds of treatment of the catalyst, particularly aqueous wash or soak treatments at elevated temperature.

From another batch (Batch IV) of the BASF R3–11 catalyst the dry crush strength of sample pellets, tested as received, was $95 \pm 21$ lb./in. Pellets from this batch crushed in the wet state at $56 \pm 9$ lb./in. after being wet for one hour and $40 \pm 7$ lb./in. after 14 days wetting. Pellets from this batch which were wet and then dried in air at 110° C., crushed dry at $61 \pm 9$ lb./in. Pellets wet and then dried and then wet again for one hour, crushed wet at $28 \pm 6$ lb./in. Other pellets from this same batch were calcined, as received, at 400° C. for 16 hours. Another sample from the same batch was calcined at 450° C. for 16 hours. After calcining, the pellets which were calcined at 400° C. crushed dry at $168 \pm 41$ lb./in. and crushed wet, after being wet for one hour, at $88 \pm 25$ lb./in. The pellets calcined at 450° C. crushed dry at $155 \pm 44$ lb./in. and crushed wet, after being wet for one hour, at $91 \pm 12$ lb./in.

Since the catalyst in use is wet and in reduced state, further measurements of the catalyst strength were carried out after reduction and washing with water for two days. It was found that catalyst of the same lot (Batch II) which was reduced without prior treatment (see Example 2 for reduction procedures) and then washed with deaerated and deionized water at 75° C. for two days crushed wet at 18±2 lb./in. Furthermore, after about 4 months operation the catalyst was found to have a wet crush strength of only about 10 lbs./in. with many pellets so badly fragmented or so soft to the touch that the strength of those pellets could not be measured. The same catalyst calcined at 400° C. for 16 hours, reduced and washed for two days crushed wet at 30±6 lb./in. Likewise, catalyst calcined at 450° C. reduced and washed for two days crushed wet at 36±6 lb./in.

Calcination after reduction was also investigated. Batch IV catalyst was reduced, then calcined at 350° C. for 17 hours and washed for two days. The wet crush strength was 39±10 lb./in. Continued washing for one month reduced the wet strength to 30±7 lb./in. In exactly the same manner, if calcination after reduction is carried out at 400° C., the wet strength is 54±17 lb./in. after two days washing and 37±8 lb./in. after one months washing.

The results show that there is a severe loss of strength when the catalyst is reduced. Furthermore, the catalyst continues to lose strength with time in use. It is therefore of considerable importance in industrial sized deep beds intended for continuous operating for a period of about a year or more to increase the initial strength of the catalyst so that the catalyst will retain strength sufficient for use in the reactors over a longer period.

These tests established that increase of both dry and wet crush strengths would be obtained by calcining the catalyst but the effects of calcining on the catalytic activity in the hydration reaction were still uncertain. Further tests under conditions simulating actual operating conditions were conducted to examine catalytic activity in use of the calcined catalyst in a fixed bed catalytic reactor for the hydration of acylonitrile.

EXAMPLE 2

A. In an oven, 90.7 gms. of BASF Catalyst R3-11 from Batch II as received is heated to 450° C. and calcined at that temperature for 45 hours and then gradually cooled. The calcined catalyst is charged to a laboratory fixed bed continuous reactor. The reactor is purged with nitrogen to remove all of the air. The next step is to reduce the catalyst and this is done by first bringing the bed temperature to 180° C. and then beginning gradual addition of hydrogen into a stream of nitrogen flowing through the bed. At first, the concentration of hydrogen in the nitrogen stream is about 1.5 percent and this is gradually increased as needed to maintain the bed temperature in the range from 180° to 220° C. as the exothermic reduction of copper proceeds. The total reduction time is about 6-7 hours. When there is no further reduction the bed is gradually cooled to room temperature after which the flow of deaerated and deionized (DA-DI) water at 75° C. is begun and continued for a period of about 40 hours to remove soluble inorganics. Then the reaction is begun by introducing a 7 percent solution of deaerated acrylonitrile in DA-DI water as the reactant stream to the reactor. During most of the continuous hydration the flow rate of the reactant stream is regulated to maintain about 85 to 90 percent conversion but at periodic intervals the flow rate is varied to obtain several different conversion rates for short times for test purposes. The reaction temperature is maintained at about 70° C. As the activity of the catalyst declines the feed rate is decreased to maintain the conversion rate in the selected operating range. The selectivity of conversion to acrylonitrile is near 100 percent throughout the continuous process. The reactor temperature is maintained at about 70° C. throughout the operation by a constant temperature oil bath in which the reactor is submerged. The reactor is run continuously for several months. The catalyst activity at the beginning of the reaction is indicated by an initial productivity rate of 112 lbs. AMD produced per 1000 lbs. catalyst per hour. At the observed activity decay rate, productivity declines to 92 at the end of three months, to 78 at the end of six months, and to 68 at the end of nine months.

All of the productivity rates expressed herein are the values obtained by measurements made at a selected conversion of 60 percent conversion per pass during the short test periods. Thus, the reported productivity rates for all of the hydration reactions that were run at the same reaction temperature are directly comparable for indication of the relative catalytic activities.

B. A control run is operated in another identical reactor using other catalyst from the same batch which is prepared without calcining. The catalyst as received is charged to the reactor and washed with water at 75° C. for 2-3 days and then dried with air at 100° C. before reduction and the catalyst is reduced by the same process described for reduction of the previous catalyst. The control catalyst is then used in the continuous hydration reaction the same as the previously described reaction. At the beginning of the hydration at 70° C. the freshly reduced catalyst has an initial productivity rate of 132. At the observed decay rate, the productivity rate at the end of three months continuous running will have declined to 98 and then to 77 at six months and to 64 at nine months.

C. Another reactor is prepared by loading the reactor with 63 gm. catalyst from the same Lot II, reducing the catalyst with hydrogen in a nitrogen stream as described above and then calcining the catalyst by gradually increasing the catalyst temperature to the calcining temperature of 350° C. by flowing hot nitrogen (with trace amount of hydrogen) through the bed. The catalyst bed temperature is held at 350° C. for three hours and then gradually cooled by reducing the temperature of the flowing nitrogen. The catalyst bed is then washed for 2-3 days with water flowing through the bed at 75° C. and then the reactor is charged with a feed stream of 7 percent acrylamide aqueous solution at 70° C. to begin the continuous catalytic hydration process. The feed rate is adjusted to obtain 85-90 percent conversion per pass. Initial activity of the catalyst is indicated by an initial productivity rate of 111. At the end of three months on stream the productivity declines to 93, decreasing to 80 at six months to 70 at nine months.

In the three continuous hydration reactions described above, the control catalyst has higher initial activity but suffers a more precipitous decline of activity. At the end of six months all three catalysts have roughly equivalent activities and at the end of nine months the activity of the control catalyst has fallen below the activities of the calcined catalysts. The average productivity of each of the three catalysts over three, six and nine month periods was calculated and is tabulated below. Over the nine month period the control catalyst has produced only slightly more acrylamide than the calcined catalyst. As the production continues beyond nine months, the average productivity of the calcined catalyst will exceed that of the uncalcined catalyst.

|  |  | Average Productivity at 70° C. over period of | | |
|---|---|---|---|---|
|  |  | 3 months | 6 months | 9 months |
| Example | 2a. | 101 | 93 | 86 |
|  | 2b. | 113 | 100 | 90 |
|  | 2c. | 102 | 94 | 87 |

By operating the continuous reaction at 85° C. instead of 70° C. the reaction is accelerated and the catalyst decay is also accelerated. Thus, the contrast of behavior of a calcined catalyst and a control catalyst is more marked within a given period.

D. A control catalyst is prepared and used the same as described in 2(b) above except the continuous hydration reaction temperature is maintained at 85° C. instead of 70° C. Initial productivity is 248, declining to 160 at the end of three months, 118 at six months and 94 at nine months.

E. A post-reduction calcined catalyst is prepared and used the same as in 2(c) above except the continuous hydration reaction temperature is maintained at 85° C. instead of 70° C. The initial productivity is 215, declining to 174 at the end of three months, to 146 at the end of six months and 126 at the end of nine months.

The average productivity of the two catalysts over three, six and nine month periods is tabulated below. At the end of six months the calcined catalyst has produced more acrylamide than the control, and still more at the end of nine months.

|  |  | Average Productivity at 85° C. over period of | | |
|---|---|---|---|---|
|  |  | 3 months | 6 months | 9 months |
| Example | 2d. | 198 | 167 | 147 |
|  | 2e. | 193 | 176 | 162 | and the catalyst bed temperature is held at 400° C. for 21 hours to calcine the catalyst. The catalyst bed is then cooled and purged with nitrogen and reduced with hydrogen, cooled and then started on stream with an aqueous 7 percent acrylonitrile reactant solution, all by procedures essentially the same as those described in Example 2 except the wash is omitted after the reduction step. The continuous hydration reaction is carried out at 70° C., 85-90 percent conversion.

B. A control reactor is prepared by preparing and reducing the catalyst bed the same, using catalyst from the same batch, except the calcining step is omitted and the catalyst bed is charged with 65 gms. instead of 100 gms. catalyst because the reactor size is not the same. The hydration reaction is carried out the same in the control reactor as in the test reactor.

C. Still another test reactor is prepared by first calcining 115 gms. of catalyst from the same batch at 400° C. for 17 hours, cooling the bed and then reducing, cooling to about 75° C. and then soaking the reduced catalyst with deaerated 5 percent Na$_2$SO$_4$ solution overnight at 75° C. and then washing with deaerated, deionized water for 2-3 days. The reactor is then operated in the hydration reaction as described above, at 70° C., 85-90 percent conversion.

Productivity initially and at the end of three, six and nine month periods at the observed decay rate are tabulated below. The calculated average productivity for each reaction over three month, six month and nine month periods are also tabulated for each reaction. At the end of six months, both of the calcined catalysts have produced more acrylamide, at the average productivity for that period, than the control catalyst has produced. At the end of three months, the activity of the control catalyst, though initially higher, has declined to activity below that of the either of the calcined catalysts.

|  |  | Productivity measured at 70° C. | | | | Average productivity at 70° C. over period of | | |
|---|---|---|---|---|---|---|---|---|
|  |  | Initial | 3 months | 6 months | 9 months | 3 months | 6 months | 9 months |
| Example | 3a. | 122 | 100 | 85 | 74 | 110 | 101 | 94 |
|  | 3b. | 155 | 94 | 68 | 53 | 119 | 99 | 86 |
|  | 3c. | 116 | 107 | 99 | 92 | 111 | 107 | 103 |

EXAMPLE 3

For commercial production of acrylamide by catalytic hydration of acrylonitrile, it has been found advantageous to treat the BASF Catalyst R3-11 with an aqueous solution of a soluble sulfate, such as an alkali metal sulfate, in order to fix barium in the catalyst. This prevents leaching of barium from the solid catalyst into the liquid product stream as the catalytic reaction is carried out.

A. A laboratory size, fixed-bed reactor is charged with 100 gm. of BASF Catalyst R3-11 from another batch designated Batch IV, as received. Before any heat treatment, the catalyst bed is soaked for about 20-24 hours in a 5 percent Na$_2$SO$_4$ aqueous solution at 75° C. The sulfate solution is drained off, and the catalyst bed is then washed with water circulated through the bed at 75° C. for 2-3 days to remove sulfate. After washing, the bed is dried by flowing air heated to 110° C. through the bed until dry. The temperature of the bed is then raised to 400° C. by flowing heated air through the bed,

EXAMPLE 4

Experiments were carried out to investigate the interaction of post-reduction calcination time and temperature and the resulting effect on catalyst strength, activity and life.

Batch IV catalyst was used in all cases. The catalyst was reduced in the reactor as described in the previous examples and then calcined in the reactor by flowing hot nitrogen (with a trace of hydrogen) through the bed of reduced catalyst. The calcining temperature and time held at that temperature is shown in the Table below for each run. After calcining and cooling, the catalyst was washed by flowing of DA-DI water for two days through the bed. In the case of the control, calcination was not carried out. Wet crush strength of catalyst samples was measured. The reactors were operated as described in the previous examples for the hydration reactions, except the reaction temperature was maintained at 80° C. in all reactors. The results are shown in the attached Table. This example demonstrates that post-reduction calcination at lower temperatures but for longer times is effective for giving increased crush strength and catalyst life while minimizing the loss of initial activity.

Optimum conditions for post-reduction calcination appear to be calcining in the temperature range of 300°–350° C. for one to two days.

Example 4

Batch IV Catalyst
Post-reduction calcination
Catalyst reduced, calcined and washed for two days at 75° C.
Crush strength was measured in the wet state
Hydration reaction was carried out at 80° C.

| | Post-reduction calcination | | Crush strength lb./ in. | Reactor maintained at 80° C. | | | | | | |
|---|---|---|---|---|---|---|---|---|---|---|
| | | | | Productivity measured at | | | | Average productivity over | | |
| Ex. | temp.°C. | time, hrs. | | initial | 3 months | 6 months | 9 months | 3 months | 6 months | 9 months |
| 4a. | control, | not calcined | 21 ± 6 | 203 | 145 | 113 | 92 | 171 | 149 | 133 |
| 4b. | 300 | 48 | 31 ± 6 | 191 | 151 | 125 | 107 | 170 | 153 | 141 |
| 4c. | 350 | 3 | 26 ± 6 | | | | (No data) | | | |
| 4d. | 350 | 17 | 39 ± 10 | 175 | 140 | 116 | 100 | 156 | 142 | 130 |
| 4e. | 400 | 3 | 36 ± 7 | | | | (No data) | | | |
| 4f. | 400 | 17 | 54 ± 17 | 144 | 125 | 110 | 98 | 134 | 125 | 118 |

Calcining of the catalyst either before or after the reduction step is found to cause some loss of initial catalyst activity but it also improves the rate of decay of catalyst activity. Therefore, the calcined catalysts remain active over a longer period of use in the reactor than the useful period for the uncalcined catalyst. When the calcining is carried out after the catalyst has been reduced it is necessary to protect the catalyst from oxidizing agents during calcining and so an atmosphere of heated nitrogen or other inert gas surrounds the catalyst during the calcining operation. A small amount of hydrogen (e.g. 1%,) may be added to purge any transient oxidizing agents.

It is observed that milder calcining conditions, i.e. lower temperatures, cause less loss of initial catalyst activity while more severe calcining conditions cause more improvement of the physical strength, hence longer catalyst life. While it has not yet been determined just which combinations of the several variable calcining conditions will produce the optimum calcined catalyst, there is enough experimental data to demonstrate the improvements obtained and to define certain general ranges of calcining conditions for improving the catalyst. It is also noticed that the copper magnesium silicate catalysts of the type treated by the invention may tend to vary in small degree from one lot to another with respect to the values of several properties affected by a similar treatment, such as initial activity, crush strength, etc., so that precise productivity values and rate of decay of the catalytic activity may be found to vary in some instances to small degree depending on the particular properties of any catalyst lot. While precise quantitative values are not always reproducible, a general improvement of the total quantity of product obtained with a catalyst lot treated by the invention is obtained by improvement of the rate of decay of the catalytic activity as the treated catalyst is used for the hydration of nitriles in a fixed bed reactor and by the expected longer catalyst life due to increase of catalyst strength of calcining.

We claim:

1. In a process for catalytic hydration of acrylonitrile to produce acrylamide by flowing a reactant solution comprising acrylonitrile in water through a fixed bed of copper-magnesium silicate type catalyst after reduction of the catalyst, the improvement wherein said catalyst has been treated prior to the hydration reaction by calcining the catalyst in a non-reactive atmosphere at calcining temperature in the range from 300° to 500° C. for time sufficient to substantially decrease the rate of decay of catalytic activity during use of the reduced catalyst in the defined hydration process.

2. An improved process defined by claim 1 wherein the defined catalyst has been treated by calcining, as defined, before the catalyst is reduced.

3. An improved process defined by claim 1 wherein the defined catalyst has been treated by calcining, as defined, after the catalyst is reduced.

4. An improved process defined by claim 1 wherein the defined catalyst is additionally treated by washing the catalyst with an aqueous solution of sodium sulfate and rinsed clear of sulfate before the catalyst is used in the hydration reaction.

* * * * *